Figure 2:
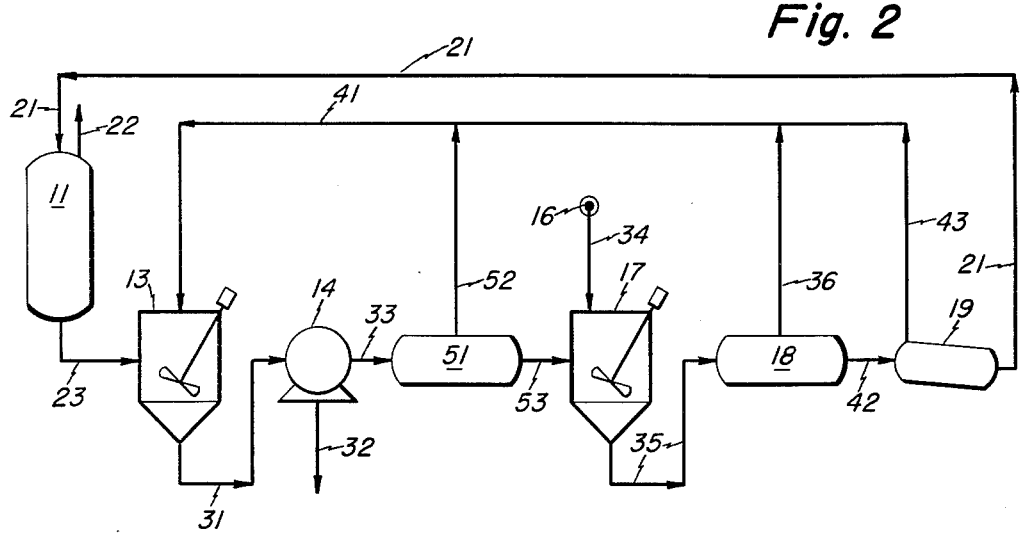

April 19, 1966  N. FRAGEN  3,247,246
CYCLIC PROCESS FOR PRODUCTION OF TEREPHTHALIC ACID
Filed Nov. 6, 1961

INVENTOR.
Nathan Fragen
BY
Gerald Rose
ATTORNEY

United States Patent Office 3,247,246
Patented Apr. 19, 1966

3,247,246
CYCLIC PROCESS FOR PRODUCTION OF
TEREPHTHALIC ACID
Nathan Fragen, Hammond, Ind., assignor to Standard
Oil Company, Chicago, Ill., a corporation of Indiana
Filed Nov. 6, 1961, Ser. No. 150,338
1 Claim. (Cl. 260—515)

This invention relates to the preparation of terephthalic acid. More particularly, it concerns the recovery of terephthalic acid are produced by the so-called "Henkel process" for converting potassium salts of aromatic acids to dipotassium terephthalate.

Terephthalic acid, an intermediate widely used in the preparation of polyester films and fibers, may be made by various processes. Recently, the "Henkel process" has become of commercial interest. There are in fact two "Henkel processes"; in one (Belgian Patents 522,849, 524,-305, 547,301-2, U.S. Patent 2,863,913, U.S. 2,794,830, etc.) the potassium salt of either benzoic acid, phthalic acid, or isophthalic acid is disproportionated or isomerized to dipotassium terephthalate, while in the other (Belgian Patents 561,194, 576,528, etc. ) benzene is reacted with potassium carbonate in the presence of metal carbide "water-binding" agents to produce the dipotassium terephthalate. It is the former process with which the present invention is primarily concerned.

While the Henkel process has been responsible for much interest and has resulted in the generation of many patents, commercialization has thus far been limited. This appears to be the result of difficulties in satisfying the economic requirement of recovering and reusing potassium from the crude dipotassium terephthalate reaction product. In general, various acids are used for "springing" free terephthalic acid from the reaction products, but in most cases the liberating acid has either been too weak, causing incomplete potassium recovery, or excessively strong, making the liberating acid itself unrecoverable. The one exception, lower fatty acids, possess the proper strength, but have not heretofore been integrated into an overall process.

A cyclic process has now been discovered, according to the invention, employing lower fatty acids, for instance acetic acid, whereby outstanding recovery of both the terephthalic acid and the potassium may be attained. Moreover, the fatty acids may be recovered and recycled in a unique manner which is both simple and convenient. In addition, the inventive method also enables Henkel process catalysts to be recovered and reused economically.

By virtue of the foregoing it has now been possible to provide an integrated cyclic Henkel process, and one which is free of difficulties hitherto experienced. Thus, according to one embodiment, crude reaction products from a Henkel process are dissolved in water, treated with a fatty acid to precipitate terephthalic acid which may thereupon be removed by physical means, and the resultant aqueous solution of the potassium salt of the fatty acid may be reacted with benzoic acid or other terephthalic acid precursor to form a solution of the corresponding potassium salt. This is then heated to distill off the fatty acid, and the remaining salt then fed to the Henkel process conversion reactor. The cycle is then repeated.

In the foregoing embodiment, it is desirable to employ a substantial excess of lower fatty acid over the stoichiometric requirements of the dipotassium terephthalate reaction product. However, in an alternative embodiment, only substantially the stoichiometric amount of fatty acid need be used, and for reasons which will be evident upon subsequent discussion, considerable additional equipment savings may be realized.

Figure 1:
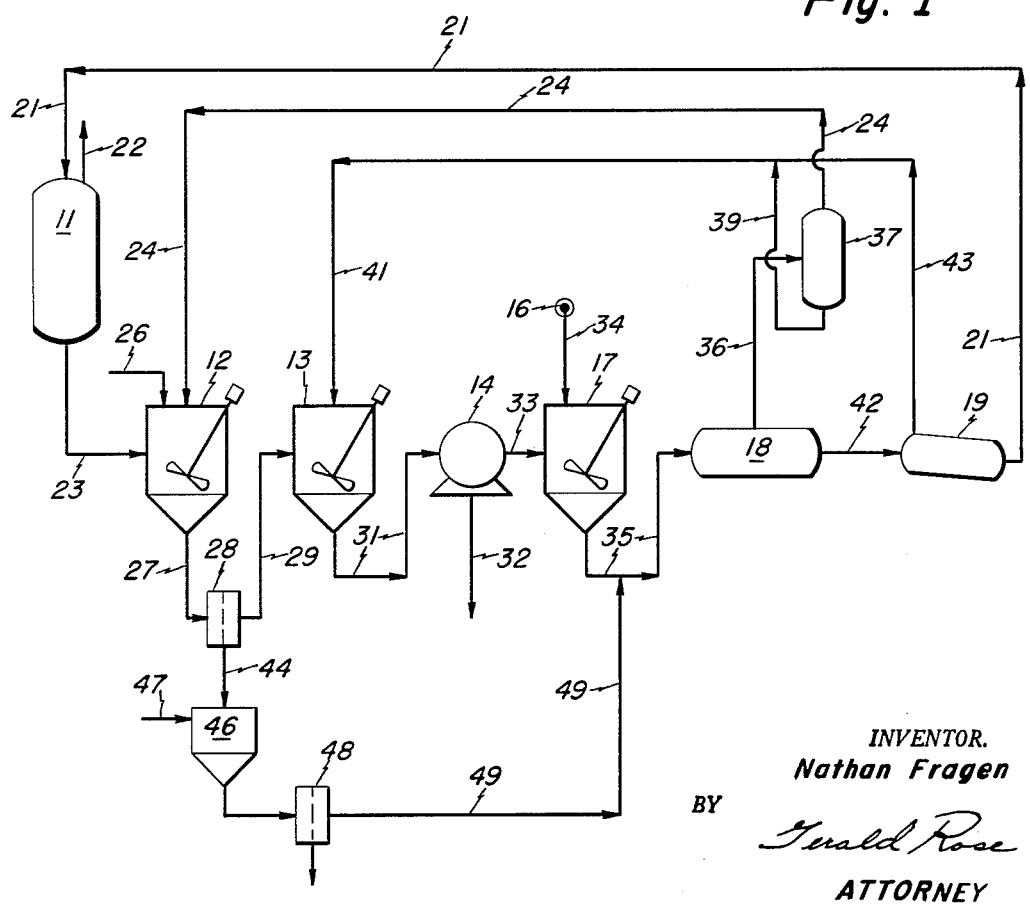

Both embodiments of the invention, as well as suggested variations thereof, will be considered in the ensuing discussion, which is to be read in conjunction with the attached drawings wherein:

FIGURE 1 is a schematic flow sheet showing an embodiment where the lower fatty acid is employed in substantial excess; and FIGURE 2 depicts an alternative to the FIGURE 1 process, in which the lower fatty acid is used in substantially stoichiometric amounts.

It will be appreciated that the drawings are intended to be schematic only, and that various auxiliaries, utilities, duplicate and staged equipment, pumps, gages, etc., have been eliminated from the drawings for reasons of clarity and simplicity. However, the need for and location of these will be apparent to those skilled in the chemical engineering arts in light of the present description.

Turing first to FIGURE 1, an embodiment of the invention is schematically depicted which illustrates the preferred form of the invention. The basic items of equipment, in process sequence order, are Henkel process reactor 11, reaction product dissolving tank 12, terephthalic acid springing tank 13, centrifugal separator 14, benzoic acid dissolving tank 17, evaporator 18, and potassium benzoate drier 19. For the process exemplified, benzoic acid is converted to potassium benzoate, while the lower fatty acid employed is acetic acid. Other terephthalic acid precursors, i.e. phthalic acid, phthalic anhydride, isophthalic acid and benzene—the latter requiring somewhat different handling techniques—may be processed by the same or an essentially similar procedure. Likewise the other lower fatty acids, that is formic, propionic, and, less desirably the butyric acids, may be substituted for acetic acid, with the essential equipment remaining the same although concentrations and process conditions will require modification for optimum utilization of each acid.

Conversion of potassium benzoate, charged via line 21 to reactor 11, is accomplished according to the well-known Henkel process as more fully is described in the introductory portion of this patent. Temperatures generally range between about 250° C. to about 400° C. (482–842° F.), but are said to be preferably above 350° C., optimumly within the range of 400 to about 420° C. The pressure within reactor 11 is preferably above 40 atmospheres, this being chiefly artificially imposed carbon dioxide pressure, while pressures of 200 and even 4,000 atmospheres are said to be useful. Catalyst, which are most suitably the metals zinc, cadmium, mercury, lead, iron, or other heavy metals, and which may be employed either as the element or in oxide or in salt form, may also be employed, and it is a particular advantage of the procedure described herein that such catalysts may be recovered and reused without unduly complicating the operation. Catalyst concentrations are usually within the range of about 1–5 weight percent on potassium benzoate or other feed, and are preferably within the range of about 3–5 percent. Conversion times may range from, say, 5 minutes to as much as 24 hours or even longer.

During the reaction, should there be any decarboxylation in addition to the desired disproportionation, excess carbon dioxide may form. Also, when potassium benzoate is employed as the feed, benzene forms as a co-product. If desired, these components may be vented through vent line 22, from whence benzene may be removed by scrubbing with, for example, high boiling petroleum gas oil, which may then be stripped to liberate the benzene while unabsorbed carbon dioxide may be vented and/or recovered for reuse or for other purposes.

At the conclusion of a desired conversion reaction, the original potassium benzoate feed has been converted to dipotassium terephthalate, with the concurrent production of a benzene co-product. The crude reaction mixture may then be transferred via line 23 to dissolving tank 12, where it is taken up in water.

In dissolving tank 12 the reaction products are dissolved in water, admitted via line 24. This water, in the embodiment shown, is free of any substantial amount of acid, so that no terephthalic acid is precipitated in dissolving tank 12. It has been found that the optimum temperature for dissolving tank 12 is the normal boiling temperature of the resultant solution; dipotassium terephthalate dissolves in boiling water to the extent of about 400 grams per liter of water, and its solubility at 26.1° C. (79° F.) is 288 grams per liter of water. Temperatures other these may of course be employed, and the tank may be maintained under pressure if desired to achieve even higher temperatures and concurrently greater solubility.

For economy of downstream operations, particularly with respect to distillation heat load, it is desirable to employ as small amount of water as is possible, consistent with other factors such as purity of terephthalic acid precipitate. Secondly, although highly concentrated dipotassium terephthalate solutions can be obtained, it appears that solutions ranging from about 5 to about 15 percent salt content are optimum in all regards, although this may be increased to as much as 50 percent or more under particular economic conditions. In the present illustrative embodiment, a boiling 10 percent potassium terephthalate solution is produced.

Adsorbent carbon, i.e. activated charcoal, may be introduced via line 26 into dissolving tank 12 for the purpose of treating the solution for removal of colored by-products. Usually less than about one percent by weight of absorbent carbon on dipotassium terephthalate need be employed.

The solution from spring tank 12 is then transferred via line 27 to a physical separator such as filter 28, where the carbon and insoluble catalyst, e.g. cadmium terephthalate, are separated, and are processed in a manner to be discussed presently. From filter 28 the decolorized stream is passed via line 29 to springing tank 13.

As a result of considerable research, it has been found that the conditions for optimum precipitation of terephthalic acid by reaction between aqueous dipotassium terephthalate and aqueous lower fatty acid are quite important, although they may be varied over wide ranges with more or less equally satisfactory results. It has, for example, been found that, in a batch operation, it is preferable to add the dipotassium terephthalate to the acetic acid rather than vice versa, and in either a continuous or a batch operation it is highly desirable to insure adequate mixing.

Furthermore, the concentration of acetic acid, together with the ratio of acetic acid to dipotassium terephthalate, are important variables. For example, as may be seen from the examples presented hereinafter, both the recovery and purity of terephthalic acid are superior when the initial dipotassium terephthalate solution is rather low, e.g. 1.8 percent by weight, instead of a more concentrated 10 percent or so. However, 10 percent dipotassium terephthalate solutions and even solutions with higher salt contents may be processed readily with attendant savings in downstream distillation costs with a concentrated precipitant (acetic acid) solution, e.g. 20–80 volume percent, and preferably about, say 50 volume percent. In the preferred embodiment, a 10 percent dipotassium terephthalate solution is added to a 50 volume percent aqueous acetic acid solution.

With respect to the molar ratio of acetic acid to dipotassium terephthalate, it has been found that the stoichiometric 2:1 ratio is generally adequate, but for preferred results this ratio should be substantially higher than stoichiometric, as for example greater than 2.5:1 and preferably at least about 3:1 or even more—up to 6:1 and possibly even higher. A ratio of 4:1 of acetic acid to dipotassium terephthalate is used in the illustrative embodiment.

Temperature does not appear to be a significant variable for the precipitation. Temperatures above about 20° C., and preferably within the range of about 60–100° C., offer some advantage with respect to minimizing the amount of water which need be present.

Springing tank 13, which is equipped with a rotary mixer for efficient agitation, is sized so as to afford a holding time of about 5 minutes. At the end of this period, the magma is transferred via line 31 to a physical separating means such as centrifugal separator 14. Here the terephthalic acid crystals are separated from the mother liquor, which at this stage is composed of water, excess acetic acid, and potassium acetate. As an alternative or adjunct to centrifugal separator 14, other separating or thickening systems may be employed, such as for example, hydrocyclones, Dorr thickeners, filters, etc.

The stream of terephthalic acid emitted from centrifugal separator 14 is wet with mother liquor. If desired, this stream may be washed with dilute acetic acid and/or water for purification, and then dried and sent to product storage via line 32.

The mother liquor discharged from centrifugal separator 14 is conducted via line 33 to dissolving tank 17, where benzoic acid feed stock is admitted from source 16 and line 34. In the agitated dissolving tank 17, benzoic acid reacts with potassium acetate to form an equilibrium with potassium benzoate; this equilibrium is disrupted in evaporator 18 when acetic acid is removed by distillation.

The solution thus prepared in dissolving tank 17 is conducted via line 36 to the evaporator.

Evaporator 18 constitutes a portion of the system wherein water and acetic acid are removed by distillation (the term is defined broadly to include evaporation, azeotropic distillation with the aid of such azeotroping agents as methyl ethyl ketone or benzene) and where the resultant potassium benzoate is dried in preparation for its being charged to the Henkel process reactor 11.

Evaporator 18 may be a single or multiple stage evaporator, where water and acetic acid (liberated in dissolving tank 17) are taken overhead via line 36 and passed to drying column 37. In turn, this column 37 separates water as an overhead through line 24, and concentrates or dehydrates the acetic acid as a bottom product taken through line 39. The water overhead from this distillation column 37 passes via line 24 to dissolving tank 12 as a recycle stream, while the concentrated or dehydrated acetic acid is conducted via line 39 to line 41 and thence to springing tank 13.

To assure complete dehydration and as complete as possible acetic acid removal from the potassium benzoate, potassium benzoate (or potassium benzoate slurry or solution) from evaporator 18 is conducted via line 42 to drier 19. Here the potassium benzoate is heated, advantageously in the presence of a hot gas stream, to, say, 80–200° C. or higher in order to liberate any retained acetic acid and water. Off gases from drier 19 are passed through symbolic line 43 where they join line 41; in actuality, symbolic line 43 may include a cooler and/or scrubbing tower where water and acetic acid are separated from the gas and then transmitted to line 41.

It is desirable that the potassium benzoate leaving drier 19 have as little as possible of excess potassium or of benzoic acid. This may require careful control of the amount of benzoic acid introduced into dissolving tank 17 so as to avoid any excess. If precise control is impossible or difficult, an excess of potassium is favored.

The dried potassium benzoate discharged from drier 19 is then cycled via line 21 to reactor 11 where, in the presence of an appropriate catalyst such as cadmium acetate, it is disproportionated through the Henkel process to dipotassium terephthalate and benzene. Thus the entire process can be made cyclic, and even continuous. It is also apparent that the inventive process is exceedingly flexible, and many process conditions can be varied within wide ranges to accommodate different external conditions and product quality requirements. Also, in contrast to such prior art potassium recovery procedures, e.g. employing benzoic acid as distinguished from the present lower fatty acids, substantially more concentrated acid solutions may be employed, with the result that heat loads of evaporator 18, drier 19, and distillation column 37 may be kept quite low.

An additional and highly desirable modification of the inventive procedure is the inclusion of facilities for recovering and reusing Henkel process catalysts such as cadmium acetate. Again inviting attention to FIGURE 1, insoluble cadmium terephthalate is separated from line 27 by filter 28, along with adsorbent carbon and any insoluble reaction by-products. The solid material so separated is transferred via line 44 to a dissolving tank 46, where it is intimately contacted with a dilute acetic acid solution. A portion of the solution flowing through line 41 is excellent for this purpose, and may be introduced via conduit 47. Acetic acid reacts with cadmium terephthalate to form soluble cadmium acetate and insoluble terephthalic acid; terephthalic acid, adsorbent carbon, and reaction by-products are separated in filter 48 while the soluble cadmium acetate in aqueous solution is conducted via line 49 to line 35 or to evaporator 18. By this procedure, cadmium acetate is dispersed in the potassium benzoate which ultimately is to be cycled through line 21 to the Henkel process reactor 11. The small amount of terephthalic acid discharged from filter 48 may either be discarded or may be recovered by contact with a potassium acetate solution.

Substantial equipment savings over and above those attained with the process described in conjunction with FIGURE 1 may be obtained by employing the process schematically shown in FIGURE 2, although there is somewhat of a penalty in flexibility and throughput capacity.

Inviting attention to FIGURE 2, it may be seen that identical items of equipment are assigned the same numbers as in FIGURE 1.

Essentially, the FIGURE 2 embodiment differs from that of FIGURE 1 in that the Henkel process reactor 11 effluent is contacted directly with an acetic acid solution, preferably employing substantially stoichiometrically amounts (plus or minus about 10–20 percent) without first taking up the reaction product in water. Since it is unnecessary to provide a separate water stream, water and/or acetic acid taken overhead from optional evaporator 51, evaporator 18, and drier 19 may be combined directly in line 41 and recycled to springing tank 13. No acetic acid concentration need be employed.

In both embodiments the chemical reactions are the same. Acetic acid reacts with dipotassium terephthalate to spring the trephthalic acid and form an aqueous potassium acetate solution. This solution is thereafter reacted with a precursor such as benzoic acid to form an equilibrium solution or suspension of benzoic acid, acetic acid, potassium benzoate, and potassium acetate, and thereafter the equilibrium is disrupted when the volatile acetic acid is distilled from the remaining potassium benzoate. This latter material may then be dried further and is charged to the Henkel process reactor.

Physically, there are certain distinctions between the two processes. Because it is desirable to maintain the solution in springing tank 13 substantially neutral (pH about 6–8) it is possible to use only the substantially stoichiometric quantity of acetic acid. As a consequence, some dipotassium terephthalate remains in solution and is cycled back to the reactor 11 along with freshly prepared potassium benzoate charge stock.

Referring specifically to FIGURE 2, Henkel process reactor 11 is discharged via line 23 into springing tank 13, where the reaction mixture is combined with aqueous acetic acid from line 41. Acid concentration is advantageously within the range of about 1–20 volume percent, and contact temperatures are advantageously 60–100° C.

The resultant mixture, which comprises a slurry of terephthalic acid and an aqueous solution of predominantly potassium acetate with some unconverted dipotassium terephthalate, is passed via line 31 to the centrifugal separator 14 for physical separation of terephthalic acid crystals (via line 32) from the mother liquor. As described in conjunction with FIGURE 1, these wet terephthalic crystals may be washed with dilute acetic acid and/or water for additional solution recovery and terephthalic acid product purification.

An additional feature of the FIGURE 2 embodiment is that it is unnecessary to provide separate catalyst recovery and recycle facilities. The catalyst dissolves in the dilute acetic acid solution of springing tank 13 and passes along with the balance of the solution through centrifuge 14 and ultimately is cycled via line 21 to the reactor.

Inasmuch as there is no need to provide a pure water stream, it is also possible with this embodiment to materially reduce the size of evaporator 18 and drier 19 by providing an optional evaporator 51 downstream of centrifugal separator 14. This removes much of the excess water along with some of the acetic acid, and permits the vaporized material to be transmitted to line 41 (preferably after cooling and condensation) via line 52.

The effluent from evaporator 51 is conducted via line 53 to dissolving tank 17 where it is contacted with benzoic acid (or other acid precursor) obtained from storage 16 and admitted to dissolving tank 17 via line 34. As a consequence, an equilibrium solution or slurry is set up, with a chemical equilibrium existing between benzoic acid, acetic acid, potassium benzoate, potassium acetate, and dipotassium terephthalate. This equilibrium is disrupted when the effluent from dissolving tank 17 is transferred via line 36 to evaporator 18, where volatile acetic acid is taken overhead along with water.

In further contrast to the system of FIGURE 1, the process depicted in FIGURE 2 enables column 37 (FIGURE 1) to be eliminated. Instead, acetic acid and water removed from evaporator 36 may be passed directly to line 41, with of course condensation means being provided. The discharged material from evaporator 18 is passed via line 42 to drier 19, which functions in a manner analogous to that of drier 19 in FIGURE 1.

Drier 19 dries the mixture of potassium benzoate and recycled dipotassium terephthalate to an extent which is suitable for recycle via line 21 to Henkel process reactor 11. Thus the process is made entire cyclic, and there is no reagent wastage. Consequently, only small amounts, if any, of make-up potassium (e.g. KOH) and acetic acid need be added to the system.

It is apparent therefore that the FIGURE 2 embodiment enables a commercial plant to be built with even lesser equipment costs than that of a plant constructed according to FIGURE 1. Moreover, because there is no need for separating water from aqueous acetic acid solutions there is a substantially reduced heat load, with attendant economies in utilities cost. Accordingly, it is possible to achieve even further savings by employing a plant built pursuant to FIGURE 2.

The following examples illustrate various embodiments of the inventive process, with particular emphasis on the step of effecting the reaction between the lower fatty acid and dipotassium terephthalate so as to favor the precipitation of high purity terephthalic acid. These examples are intended to be illustrative only and are not to be considered wholly definitive or exclusive with respect to conditions or scope.

EXAMPLES 1-6

These six examples illustrate the effect of acid strength and of the proportion of acid to dipotassium terephthalate. In each instance, a 10 weight percent aqueous dipotassium terephthalate solution is added to an approximately 0.26 normal aqueous solution of the precipitant acid. The following results are obtained.

*Table I.—Effect of acid strength and excess of precipitant*

[10% $K_2TA$ added to approximately 0.26 N precipitant]

| Example | Precipitant | Molar ratio, Pcpnt:$K_2TA$ | Percent TA in ppt. | Percent TA recovered | Percent K in ppt. (as $K_2SO_4$) |
|---|---|---|---|---|---|
| 1 | Formic acid | 2:1 | 99.7 | 94.2 | |
| 2 | ...do... | 3:1 | 99.8 | 99.1 | 0.019 |
| 3 | Acetic acid | 2:1 | 99.8 | 75.6 | |
| 4 | ...do... | 3:1 | 99.95 | 93.6 | 0.020 |
| 5 | Propionic acid | 2:1 | 99.9 | 71.9 | |
| 6 | ...do... | 3:1 | 99.9 | 91.2 | 0.023 |

EXAMPLES 7-18

These examples demonstrate the effect of initial dipotassium terephthalate concentration on the purity and recovery of terephthalic acid. In the following examples, it is demonstrated that higher terephthalic purity as well as higher recoveries are obtained when the initial dipotassium terephthalate solution is 1.8 weight percent strength than when it is 10 percent.

*Table II.—Effect of $K_2TA$ concentration*

[50% AcOH added to $K_2TA$]

| Example | Molar ratio, AcOH:$K_2TA$ | 1.8% $K_2TA$ | | 10% $K_2TA$ | |
|---|---|---|---|---|---|
| | | Percent TA in ppt. | Percent TA Recovered | Percent TA in ppt. | Percent TA Recovered |
| 7-8 | 0.8 | 13 | 8 | 3 | 3 |
| 8-10 | 1.4-1.5 | 83 | 50 | 4 | 5 |
| 11-12 | 2 | 99+ | 75 | 4 | 4 |
| 13-14 | 3 | 99+ | 92 | 28 | 30 |
| 15-16 | 4-4.3 | 99+ | 95 | 58 | 60 |
| 17-18 | 6 | | | 99 | 96 |

EXAMPLES 19-22

These examples demonstrate the superiority of dilute acetic acid, e.g. 0.26 normal, over a more concentrated 50 volume percent acetic acid solution for affecting precipitation of terephthalic acid. However it should also be noted that exceptionally high recoveries are obtained even with the more concentrated acetic acid when the acid is present in large excess over the stoichiometric.

*Table III.—Effect of AcOH concentration*

[10% $K_2TA$ added to AcOH]

| Example | Concentration AcOH | Molar ratio, AcOH:$K_2TA$ | TA | | Percent K in ppt., as $K_2SO_4$ |
|---|---|---|---|---|---|
| | | | Percent in ppt. | Percent recovered | |
| 19 | 0.26 N | 2:1 | 99.8 | 75.6 | |
| 20 | 0.26 N | 3:1 | 99.95 | 93.6 | 0.020 |
| 21 | 50% (vol.:vol.) | 2:1 | 11 | 12 | |
| 22 | 50% (vol.:vol.) | 4:1 | 99+ | 94 | 0.12 |

EXAMPLES 23-26

In the following examples, a striking demonstration is made of the unusual difference in terephthalic acid purity when the dipotassium terephthalate solution is added to the acetic acid solution rather than vice versa. In each of the four examples 50 volume percent aqueous acetic acid solution and a 10 weight percent dipotassium terephthalate solution is used.

*Table IV.—Effect of order of mixing*

[50% AcOH and 10% $K_2TA$]

| Example | Molar ratio, AcOH:$K_2TA$ | Percent TA in ppt. | |
|---|---|---|---|
| | | Add AcOH to $K_2TA$ | Add $K_2TA$ to AcOH |
| 23-24 | 2 | 4 | 11 |
| 25-26 | 4 | 60 | 99+ |

EXAMPLES 27-29

In these examples the relative independence of precipitation conditions is demonstrated.

*Table V.—Effect of precipitation temperature*

[50% AcOH added to 10% $K_2TA$]

| Example | Temperature, °C. | Percent TA in ppt. | |
|---|---|---|---|
| | | 2 AcOH:1 $K_2TA$ | 4 AcOH:1 $K_2TA$ |
| 27 | 25 | 4 | 60 |
| 28 | 60 | 2 | 54 |
| 29 | 90 | 3 | 60 |

From the foregoing discussion, examples, and flow sheets it is manifest that there has been provided, in accordance with the invention, an outstanding process for recovering potassium values and terephthalic acid from dipotassium terephthalate, the initial product obtained via the Henkel process. By employing a lower fatty acid to react with the dipotassium terephthalate, not only may terephthalic acid be recovered in outstandingly high yields but potassium can be recovered and reused virtually without any loss. Moreover, the process embodying the present invention enables the precipitant acid to be recycled, again without any substantial loss. Thus there has truly been provided an outstanding adjacent to the Henkel process, and one which overcomes many of its limitations.

Obviously, many alternatives, modifications, and variations of the disclosed process will be apparent to those skilled in the art in light of the foregoing description. Accordingly, it is intended to embrace all such alternatives, modifications and variations as fall within the spirit and broad scope of the appended claim.

I claim:

A method of preparing terephthalic acid which comprises the following steps:

(a) reacting an aqueous solution of a potassium salt of a lower fatty acid with a member selected from the group consisting of benzoic acid, phthalic acid, phthalic anhydride and isophthalic acid to produce a potassium salt of an aromatic acid and a lower fatty acid, (b) separating said lower fatty acid and water from said potassium salt of an aromatic acid by distillation, (c) reacting said potassium salt of an aromatic acid at a temperature within the range of about 250 to about 420° C. in the presence of a heavy metal catalyst to produce dipotassium terephthalate, (d) making an aqueous solution of said dipotassium terephthalate, (e) adding to the resulting dipotassium terephthalate solution said lower fatty acid recovered from step (b), thereby precipitating terephthalic acid and forming a solution of a potassium salt of a lower fatty acid, and (f) cycling said solution of a potassium salt of a lower fatty acid into the reaction of step (a).

References Cited by the Examiner
UNITED STATES PATENTS

| | | | |
|---|---|---|---|
| 2,841,615 | 7/1958 | Schutt et al. | 260—515 X |
| 2,879,291 | 3/1959 | Elliott | 260—525 |
| 2,904,587 | 9/1959 | Johnson et al. | 260—515 |
| 2,927,130 | 3/1960 | Schutt | 260—515 X |
| 2,930,813 | 3/1960 | Schenk et al. | 260—515 |
| 2,965,674 | 12/1960 | Prill et al. | 260—515 |

CHARLES B. PARKER, LEON ZITVER, *Examiners.*

LORRAINE A. WEINBERGER, *Primary Examiner.*